United States Patent [19]

Kirschner, Jr.

[11] 4,011,720
[45] Mar. 15, 1977

[54] GAS GENERATOR OR ROCKET MOTOR WITH SELECTIVE DISCRETE TIME VS. OUTPUT PROFILES

[75] Inventor: Thomas J. Kirschner, Jr., Port Deposit, Md.

[73] Assignee: Thiokol Corporation, Newtown, Pa.

[22] Filed: May 13, 1975

[21] Appl. No.: 577,123

[52] U.S. Cl. .................................. 60/254; 60/271; 239/444
[51] Int. Cl.² .......................................... F02K 9/04
[58] Field of Search ............ 60/254, 253, 229, 263, 60/271, 39.47; 239/444, 447; 102/49.8; 244/3.22

[56] References Cited
UNITED STATES PATENTS

| | | | |
|---|---|---|---|
| 2,489,953 | 11/1949 | Burney | 60/253 X |
| 2,519,878 | 8/1950 | Biork et al. | 60/201 |
| 2,612,747 | 10/1952 | Skinner | 60/242 X |
| 3,142,960 | 8/1964 | Bluck | 60/200 A |
| 3,301,785 | 1/1967 | Ratliff et al. | 60/255 X |
| 3,688,636 | 9/1972 | Spiess et al. | 60/254 X |
| 3,801,019 | 4/1974 | Trenary et al. | 239/444 |

*Primary Examiner*—Carlton R. Croyle
*Assistant Examiner*—Thomas I. Ross
*Attorney, Agent, or Firm*—Stanley A. Marcus; William R. Wright, Jr.

[57] ABSTRACT

A gas generator or rocket motor is provided in which discrete and accurate time vs. flow output relationships or profiles are established by the rotation of a rotor located between the exit and its combustion chamber to various positions to select one of a plurality of primary nozzles or orifices of accurately calibrated predetermined flow characteristics through which pressurized gases from the combustion chamber are directed by passages in the rotor. The gases then flow out of the device through an exit comprising nozzles in the case of a rocket motor.

4 Claims, 4 Drawing Figures

GAS GENERATOR OR ROCKET MOTOR WITH SELECTIVE DISCRETE TIME VS. OUTPUT PROFILES

BACKGROUND OF THE INVENTION AND THE PRIOR ART

In the use of gas generators or rocket motors of the solid propellant type, there often arises a need for varying the time vs. output or thrust of the device. This has usually been attempted by reduction or enlargement of the area of the exit by using movable pieces as are shown in U.S. Pat. No. 3,760,589 to Puckett et al where a sliding piston is adapted to be moved in and out of ports leading from the combustion chamber to the exit nozzle, or, by deflecting hinged restrictors into the exhaust stream at the exit nozzle as in U.S. Pat. No. 2,894,692 to Ledbetter et al. Bulb type nozzle restrictors are also used in the art as exemplified in the U.S. Pat. No. 2,637,973 to Lawrence. Each of these, however, have common problems associated with them such as inaccuracy of the exact time vs. output relationship desired, binding or sticking of the parts due to heat expansion or warping, general complexity of structure, excessive weight and large space envelopes.

The present invention on the other hand provides a simple but effective device for changing the time-output relationship to accord with a predetermined time vs. output or thrust profile by the rotation of a rotary valve from one position to another to direct the flow of gases from the combustion chamber into and through individually pre-calibrated discrete primary nozzles and thence into and through the exit, usually a nozzle or nozzles. Since each primary nozzle has its particular characteristics and each is selected and used individually, the selection of any particular one accurately reproduces that particular time-output relationship or profile by establishing the combustion chamber pressure of the overall gas generator or motor. The resulting gas generator or motor thus very accurately achieves its desired results in a structure which minimizes weight, complexity and required space envelope and should improve reliability because of its single major moving part.

Exact time vs. thrust profile rocket motors are particularly useful as motors for decoy missiles where the discrete profiles are essential to provide information which will be misleading and thus tend to obscure the profile characteristics of the main or actual missile or at least to make it more difficult to identify it.

OBJECTS OF THE INVENTION

It is, therefore, an object of the present invention to provide a useful gas generator or rocket motor wherein individual predetermined accurate and discrete output profiles over given time periods can be produced.

It is also an object of the present invention to provide a gas generator or rocket motor of the foregoing type wherein a plurality of primary nozzles of discrete different flow characteristics are selectively put into communication with the combustion chamber and its exit.

It is also an object of the present invention to provide a gas generator or rocket motor in which a rotor or rotary valve is located at the "nozzle" area which can be rotated to communicably connect the various primary nozzles with the combustion chamber in a selective manner.

It is also an object of the present invention to provide a gas generator or rocket motor of the foregoing type wherein the valve means is lightweight relative to the overall weight, within a relatively small space envelope and is of near minimum complexity.

Other objects and advantages of the present invention will be apparent from the description and claims which follow in this application.

DESCRIPTION AND OPERATION OF THE INVENTION

The present invention is useful in connection with gas generators in general of which a rocket motor is described hereinafter as a preferred embodiment.

Figure 1:
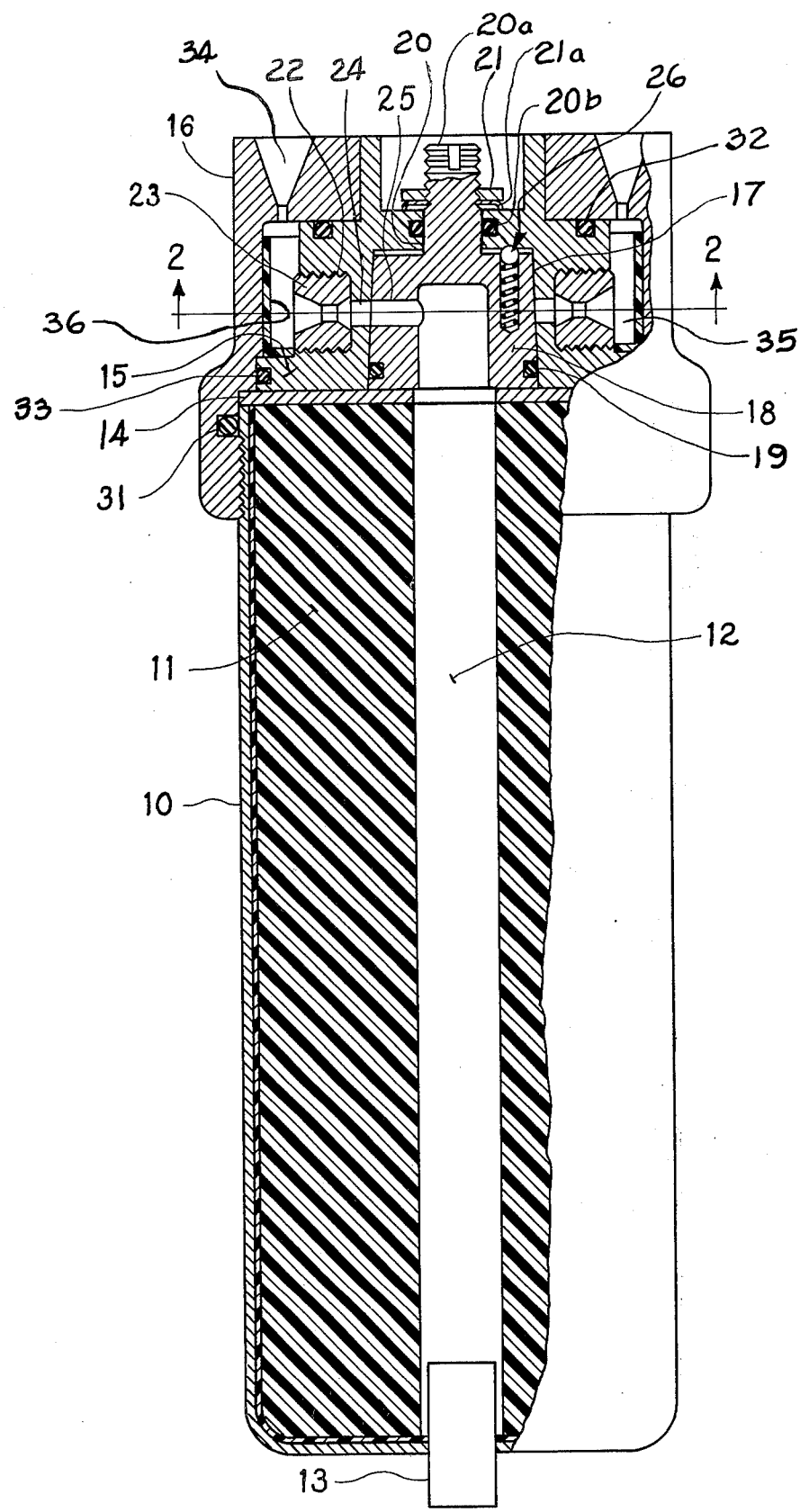
FIG. 1 is a longitudinal partial cross-sectional view showing the selector valve in position to supply combustion gas to one primary nozzle.

With respect to FIG. 1 of the drawings, a cylindrical combustion chamber casing 10 closed at its head end (at the bottom in FIG. 1) houses a solid propellant 11 having a central hollow core 12 into which is extended a conventional squib igniter 13 or the like. The igniter 13 is shown at the left end in FIG. 1 but may be located elsewhere in close proximity to propellant 11 so long as it serves to ignite the propellant and does not interfere with the mechanism, about to be described, at the after or exit end of the rocket motor. The exit end of the motor (to the top in FIG. 1) includes an end wall 14 having a central aperture as shown, a head 15 and a cap 16. A tapered central bore 17 is provided in head 15 into which a plug or rotor 18 is fitted closely and includes an O-ring seal 19 about its periphery and bearing against the bore surface 17 to provide a gas-tight seal at that point. Bore 17 has an end wall with a central aperture 20 in it through which an extension of rotor 18 passes to act as a shaft 20a journalled in aperture 20 with an O-ring seal 20b located on the shaft 20a to provide a gas-tight seal at this point. The outer end of shaft 20a is threaded to receive a jam nut 21, which in conjunction with spring washer 21a, when lightly tightened pulls rotor 18 into the tapered bore 17 sufficiently to cause the O-ring to create a substantially gas-tight seal but to allow the rotor 18 to rotate when a reasonably small torque is applied to it.

About the periphery of head 15 are a number of recesses 22 into which nozzle-like calibrated orifices or primary nozzles 23 are fitted by threading or the like, each having a different throat area and different expansion characteristics accurately designed, made and calibrated according to a specific predetermined flow rate. At the bottom of each recess is an aperture or passage 24 which provides communication between the recess and the passage 25 of rotor 18. Each primary nozzle 23 has a slot or the like in its head or exposed end to permit it to be tightened in place.

Figure 4:
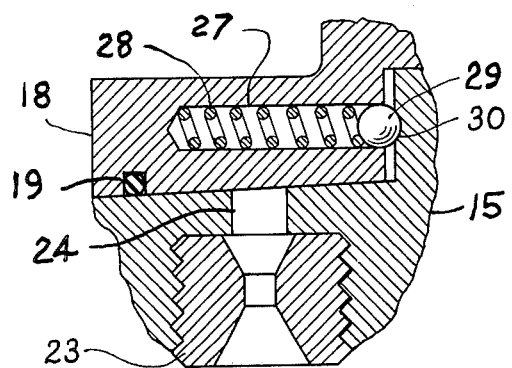
FIG. 4 is a partial cross-section of the head and rotor showing the detent.
Figure 3:
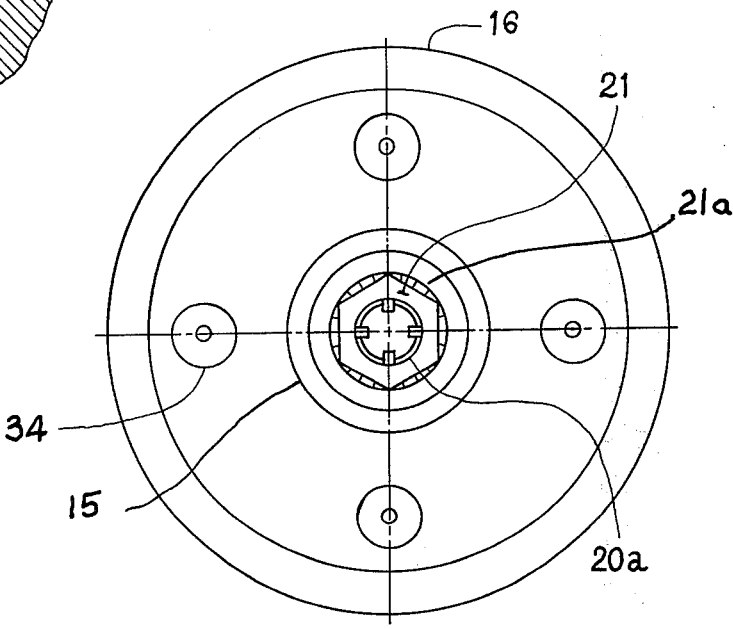
FIG. 3 is an end view of the exterior.
Figure 2:
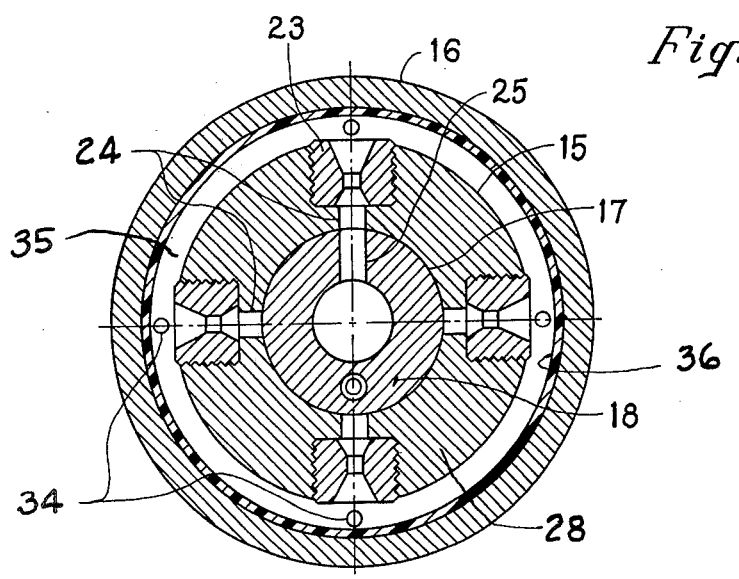
FIG. 2 is a transverse cross-sectional view taken on line 2-2 looking toward the exit.

Extended entirely through the wall of rotor 18 is the passage 25 which communicably connects with the hollow interior of rotor 18 which is itself open to the flow of hot gases from the combustion chamber. Passage 25 is individually aligned with each of the passages 24 as the rotor 18 is caused to be moved from one primary nozzle to another. A spring-loaded ball detent generally designated at 26 is provided in rotor 18 and, as shown particularly in FIG. 4, includes a cylindrical recess 27, a helical compression spring 28 and a ball 29 with the ball biased by the spring 28 in the direction of the adjacent wall of the head into which are formed concave recesses or sockets 30 sufficient to receive a portion of the ball and circularly aligned on the wall of head 15 so as to individually receive the portion of the ball as the rotor 18 is turned to the various positions. The sockets 30 are also so located that the passage 25 of rotor 18 is communicably aligned with passage 24 and a primary nozzle 23 when the ball 29 is seated in a socket 30.

Enclosing head 15 is a nozzle cap or nozzle closure 16 which is fastened to chamber 10 by suitable screw threads or the like and includes an O-ring seal 31 which form a gastight seal between the chamber 10 and cap 16. The cap 16 is generally hollow in form with an end wall through which are formed one or more identical expansion outlet or exit nozzles 34, the centerlines of which (in the event of a plurality) are ordinarily substantially equidistant from the centerline of the rocket motor so that the thrust created by the passages of hot gases therethrough will not cause a turning or twisting moment on the rocket motor unless it should be desirable for some reason that such an effect should be produced such as for steering purposes or the like. The cap 16 is spaced from the primary nozzles 23 to form a plenum or receiving chamber 35 which is in communication with primary nozzles 23 and also is in communication with exit nozzles 34 in the manner shown in the drawings. Chamber 35's inner wall opposite the primary nozzles 23 and the portion of the head wall to the left of the primary nozzles 23 in FIG. 1 are lined with an insulator 36 made of heat resistant insulating material such as a silica phenolic or the like and, gastight seals 32 and 33 are provided where the head 15 and the cap 16 come together to prevent leakage at those points.

In operation, the rotor 18 is rotated prior to the initiation of combustion until the particular desired primary nozzle 23 is selected and detent ball 29 is seated in its socket 30 after which the igniter 13 is fired and it causes ignition of the propellant 11 at its surface on the open central core 12. As the propellant 11 burns, hot gases are produced which develop pressure in the core 12 and in chamber 10 and start a flow of hot gases directly into the passage 25 of rotor 18. The gases then pass through passage 25 into and through passage 24 and then into and through the particular primary nozzle 23 which is aligned at the time with passage 25 from which it enters the plenum chamber 35 and then passes out through the exit nozzles 34 to produce a thrust through their reaction effect. The extent of the thrust is determined by the characteristics of the exit nozzles along with the quantity of gas flow and the pressure and temperature of the gases passing therethrough, in other words, the mass flow of the gas. Since the exit nozzles receive only what is in the plenum chamber 35 and will produce a time vs. output program accordingly, the primary nozzles 23 are so formed that they each have different flow characteristics, as mentioned previously herein, to maintain the combustion chamber pressure at a predetermined level and to introduce gases into the plenum chamber 35 with predetermined accurately precalibrated different characters as to flow, pressure and temperature. These primary nozzles 23 can be selectively chosen by the rotation of rotor 18 from one position to another with the detent 26 acting as a means of determining that the particular primary nozzle and passage 24 are aligned. The rotor 18 position is selected before ignition of the propellant as mentioned previously herein and rotary movement of rotor 18 can be brought about by the manual use of a hand key adapted to fit the exposed end of the shaft of rotor 18 in the case of a small motor and where the rotor shaft end is easily available, or, in the case of a large or inaccessible motor, an electric motor (not shown) with a remote control to turn it on and off and an electrically-operated clutch mounted between the electric motor shaft and a connector to the rotor's shaft.

While there have been shown and described and pointed out the fundamental novel features of the invention as applied to a single preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

I claim:

1. In a gas generator having a combustion chamber containing propellant, means for igniting the propellant to produce combustion gases and an exit means for the gases, the improvement comprising a rotary plug valve interposed between the combustion chamber and said exit means, passage means in said valve in communication with the combustion chamber, and a plurality of separate precalibrated different throat area nozzles radially arranged about said valve and means to selectively and individually align said nozzles with said passage means to afford communication therewith, and said nozzles in communication with said exit.

2. A closure head adapted to be attached to a rocket motor or gas generator combustion chamber including, in combination, walls defining an enclosed plenum chamber, at least one exit means in communication therewith and with the exterior of the head, primary nozzles of different throat areas and pre-calibrated gas flow characteristics radially disposed from and in communication with said plenum chamber, and rotary plug valve means having a passage communicably connecting the combustion chamber with a selected primary nozzle upon rotation of the valve.

3. In a rocket motor having variable flow rates and thrust output, a combustion chamber closed at one end, a solid gas producing propellant contained therein, ignition means therefor, a head enclosing the opposite end of the combustion chamber, the improvement comprising, in combination, a bore in said head, a rotor disposed in said bore in said head and adapted for rotation therein to various selective positions, passage means in said rotor in communication with said combustion on chamber and passing radially through a side wall of said rotor, substantially gas-tight seals between said rotor and said head on opposite sides of said passage means, a plurality of primary nozzles having their longitudinal axes radially disposed in said head and separately in communication with said rotor passage means when the rotor is selectively rotated to its various positions and each of said primary nozzles having different throat cross-sectional areas, means attaching said head to the combustion chamber, means collecting gas passed through said primary nozzles and at least one exit nozzle extended through said head attaching means and in commumication with said gas collecting means.

4. A rocket motor having variable flow rates and thrust output as set forth in claim 3 with the gas collecting means comprising a plenum chamber.

* * * * *